Patented June 9, 1931

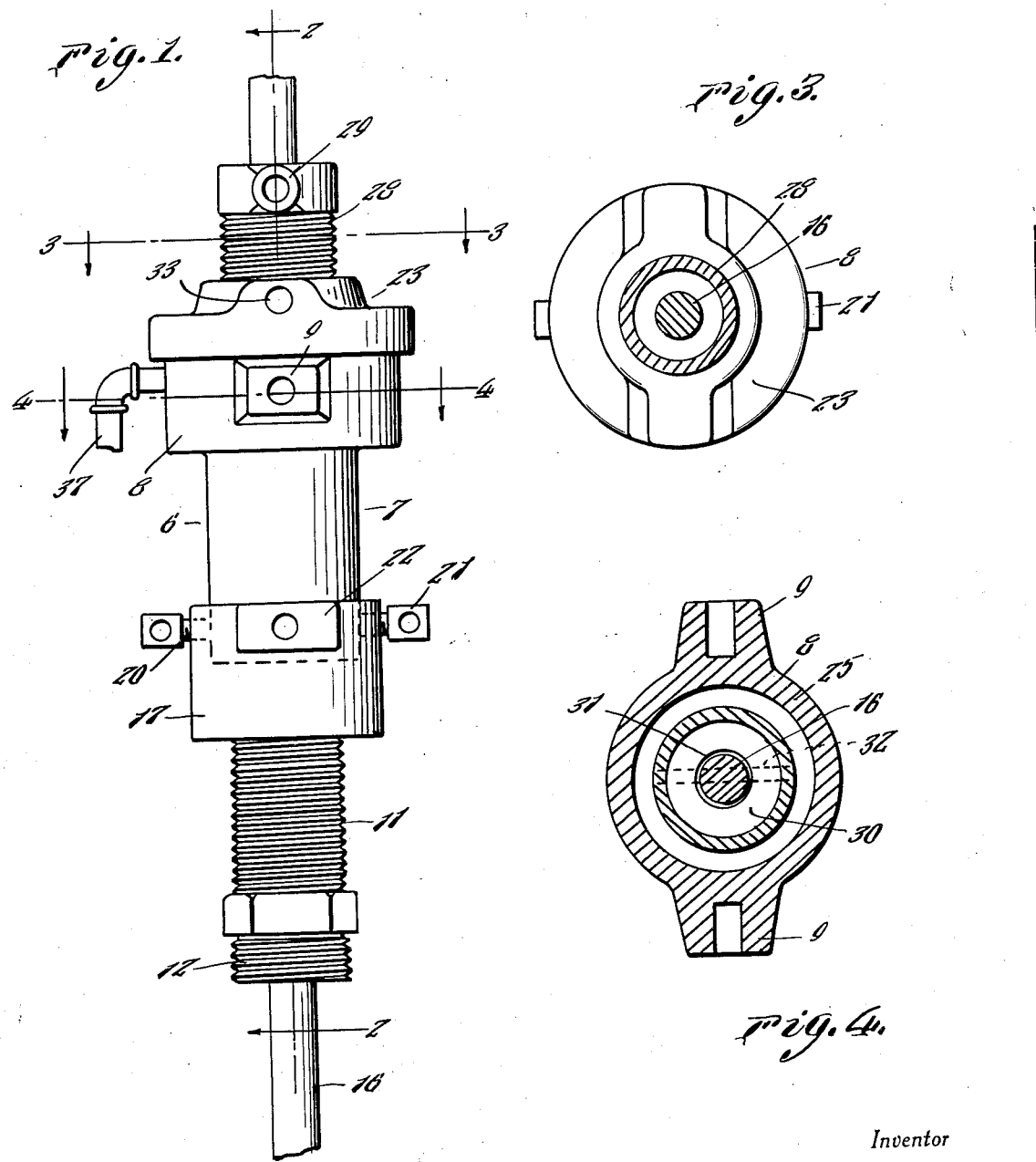

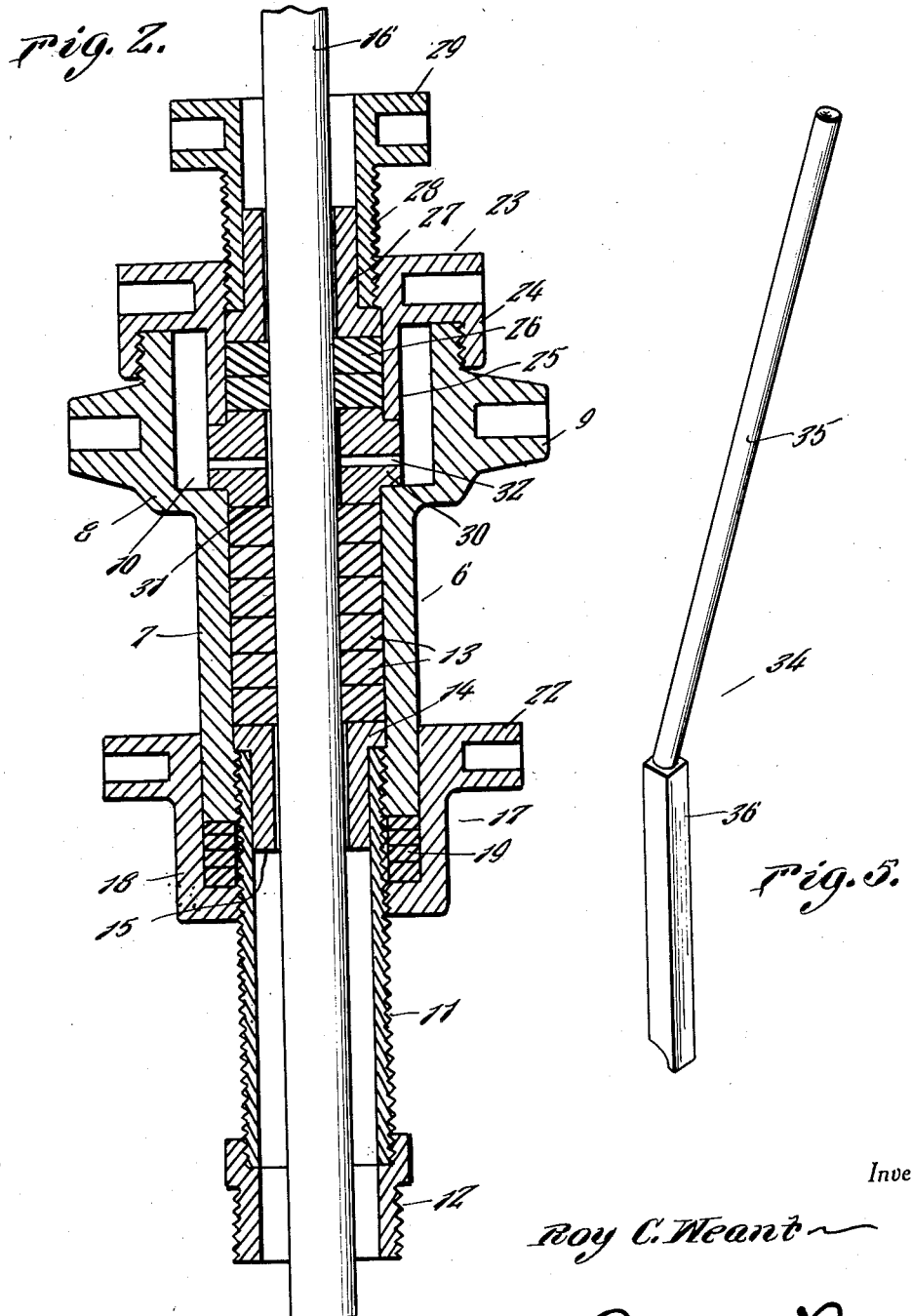

1,809,657

UNITED STATES PATENT OFFICE

ROY C. WEANT, OF PONCA CITY, OKLAHOMA

STUFFING BOX

Application filed February 25, 1929. Serial No. 342,583.

This invention relates to an improved stuffing box such as is used in association with the upper protruding end of the polish rod of an oil well pump or equivalent structure.

My principal aim is to generally improve upon inventions of this classification by providing a novel contribution to the art which is characterized by an especially designed casing or housing structure made to accommodate distinct packing assembly arranged in vertically spaced longitudinally spaced relation and individually adjustable, the lower packing assembly embodying leak stop rings and the upper assembly embodying oil wiping rings.

The object is to provide this multiple or double arrangement of packing assembly to promote efficient lubrication of the polish rods and to prevent escapage of oil in the event that the rings in the lower assembly become leaky.

Numerous other structural features and advantages are embodied in the improved stuffing box, and these will become more readily apparent from the following description and drawings.

In the drawings:

Figure 1 is an elevational view of the complete stuffing box showing a fragmentary portion of the polish rod associated therewith.

Figure 2 is a vertical sectional view taken approximately upon the plane of the line 2—2 of Figure 1.

Figures 3 and 4 are transverse sectional views taken on the lines 3—3 and 4—4, respectively, of Figure 1.

Figure 5 is a perspective view of a packing tamping tool.

The entire assembly can well be seen in Figure 2, the major part thereof is distinguished as the body portion of the structure. More specifically stated, however, this body 6 comprises a vertically elongated internally screw threaded cylinder 7 having its upper end enlarged as at 8 to provide what may be designated as a head. This is formed on diametrically opposite sides with outstanding projections 9 having sockets. This head is so made as to provide an internal chamber designated as a lubricant reservoir 10. Threaded telescopically into the lower threaded end portion of the cylinder 7 is a longitudinally elongated nipple 11. This nipple is connected with a coupling collar 12 which is in turn connected with the well casing in the manner, not shown. The body 6 accommodates the so called lower packing member. This embodies a plurality of superposed packing rings 13 confined within the cylinder 7 and bearing at their lower portions on the outstanding flange 14 of a follower sleeve 15. This sleeve is telescoped into the upper end of the nipple, and the flange bears against the end of the nipple and extends into the interior of the cylinder.

The polish rod 16 extends through the packing ring, follower and nipple, as shown.

The reference character 17 designates a packed lock nut for maintaining the adjustments between the body 6 and the complemental nipple 11. This lock nut is made in the form of a cup 18 also threaded on the nipple and made to accommodate a packing ring 19. It is attached to the cylinder 7 through the medium of set screws 20, as seen in Figure 2. Incidentally the set screws are provided with heads 21 having openings formed therein to accommodate a tool to be hereinafter described for tightening. The part 17 is also formed with outstanding diametrically opposite sockets 22 for turning.

Referring now to the upper part of the structure it will be seen that the numeral 23 designates generally the closure or cover for the head portion of the body 6. This comprises a disc like part having a screw threaded rim or flange 24 threaded on the head. It also includes a depending annulus 25 extending down into the reservoir 10 and functioning as a cup for containing the wiping ring 26 of the upper packing assembly. Arranged within this packing cup 25 is the outstanding flange of an inverted follower sleeve 27. This sleeve extends up and into a screw threaded adjusting collar 28. The collar has outstanding sockets 29 for accommodation of an operating tool. Interposed between the packing ring 13 of the lower set or assembly and the packing ring 26 of the upper assembly is a spacer or separator 30. This is so made as to engage the end of the cup 25 and the adjacent end of the cylinder 7 as seen clearly in Figure 2. It has an enlarged central vertical core 31 for passage of oil from the reservoir and radial ports or passages 32 communicating therewith. This allows circulation of the oil or lubricant in the reservoir 10 and permits effective lubrication of the polish rod. It is yet to be mentioned that the cover or closure 23 is provided with sockets 33.

In Figure 5 the reference character 34 designates an especial tool which is used in connection with this stuffing box construction. It comprises an offset cylindrical rod or handle 35 and an especially designed head portion 36. The head is for tamping clamping rings into place, and the handle is adapted to be fitted into the various sockets for turning the respective parts for sake of adjustment.

The packed locked nut 17 is adjustable as a unit with the body 6 and when the set screws are loosened it has individual adjustment for tightening the packing rings 19. When it is desired to compress the ring 19 of the lower assembly the tool is placed into one of the sockets 9 and the entire body 6 is rotated to thread it downwardly on the nipple 11. Thus the rings 13 are compressed tightly between the follower flange 14 and the spacer 30. In this connection it is to be observed that when the cover 23 is removed, and the body 6 is turned sufficiently far down on the nipple 11, the packing ring 13 may be entirely ejected from the cylinder for removal and renewal. When renewing the ring the tamping tool 36 is employed.

It is also obvious that the wiping ring 26 in the cups 25 are adjustable independently, and this is accomplished by feeding the collar 28 down thus forcing the follower 27 down against the ring and in turn compressing the rings against the spacer 30.

The pipe designated by the reference character 37 in Figure 1 is an overflow pipe which communicates with the oil reservoir to take care of surplus oil.

All stuffing boxes leak at times when the rubber rings which are used for packing, get worn. This improved stuffing box is designed with two sets of rubber rings. The lower set keeps oil from leaking and the upper set is to keep the polish rod wiped off, so that wind will not blow oil from the rod, onto the floor of the rig, in case the lower set should leak.

This stuffing box has an oil reservoir between the two sets of rings, for the purpose of pouring oil into it to keep the polish rod from becoming hot and burning up the rings, when the well has not been pumped for a period of time and the tubing is empty. The reservoir is so constructed that it holds only a certain amount of oil, either oil poured into it, or the oil that leaks into it. After the reservoir becomes so full, surplus oil is carried off through a pipe connection, to which a piece of pipe or hose may be attached, and leaking oil run down through the floor of the rig.

In conclusion the features to be emphasized are—First, the double arrangement of packing ring assembly with the wiping rings of the upper assembly so as to wipe off oil that will accumulate on the surface of the polish rod, particularly if the rings of the lower sets are leaky. In a single packing arrangement such as is ordinarily employed, when the rings leak, the oil is carried up above the surface of the platform and the wind blows it off and onto the floor, making it unsafe and untidy for the workmen.

Secondly, the compactness and convenience of arrangement of parts and the unusual economy and simplicity in construction is to be emphasized, as well as the utilization of lock nuts on the cylinder which has the double function of a packing gland to eliminate leakage at this particular point. These and other advantages and features have doubtless been made apparent from the description and drawings. Therefore, a more lengthy description is regarded unnecessary.

Minor changes in shape, size, and rearrangement of details coming within the field of invention claimed may be resorted to in actual practice if desired.

Having thus described the invention, what I claim as new and desire to secure by Letters Patent is:—

A stuffing box of the character described comprising a cylinder having an integral enlarged head on one end constituting an oil reservoir, a spacing ring seated on the upper end of the cylinder and disposed within the head in spaced relation therefrom having a central bore and oil conducting passages communicating with the bore and the oil reservoir, a closure threaded on the head and having an integral annulus depending therefrom and engaged with the spacing ring for maintaining same in position on the cylinder, packing rings mounted in the cylinder in engagement with the lower side of the spacing ring, means for compressing the packing rings against the spacing ring comprising a sleeve threaded for longitudinal adjustment in the lower end portion of the cylinder, a follower loosely mounted on the inner end of the sleeve for engagement with the packing rings, means threaded on the sleeve and slidable over the cylinder for securing said sleeve in adjusted position, wiping rings disposed in the annulus and resting on the upper side of the spacing ring, and means for compressing the wiping rings against the spacing ring comprising a sleeve threaded for adjustment in the closure and a follower mounted in the inner end of said sleeve for sliding movement through the annulus for engagement with the wiping rings.

In testimony whereof I affix my signature.

ROY C. WEANT.